(12) United States Patent
Zhou et al.

(10) Patent No.: US 8,617,636 B2
(45) Date of Patent: Dec. 31, 2013

(54) CARBOHYDRATE COMPOSITIONS HAVING A GREATER IMPACT ON THE INSULINEMIC RESPONSE THAN ON THE GLYCEMIC RESPONSE, THEIR PREPARATION AND THEIR USES

(75) Inventors: Liuming Zhou, Geneva, IL (US); Tom Parady, Batavia, IL (US); Chandani Perera, Batavia, IL (US); Robert Gerhardt, Sutter, IL (US); Daniel Wils, Morbecque (FR); Dominique Baumann, South Elgin, IL (US); Marie-Helene Degrave-Saniez, Lille (FR)

(73) Assignee: Roquette Freres, Lestrem (FR)

( * ) Notice: Subject to any disclaimer, the term of this patent is extended or adjusted under 35 U.S.C. 154(b) by 484 days.

(21) Appl. No.: 12/571,684

(22) Filed: Oct. 1, 2009

(65) Prior Publication Data
US 2011/0081474 A1  Apr. 7, 2011

(51) Int. Cl.
*A23G 3/00* (2006.01)
*A23G 3/34* (2006.01)

(52) U.S. Cl.
USPC .......................................... 426/658; 426/660

(58) Field of Classification Search
USPC .................................................. 426/590, 658
See application file for complete search history.

(56) References Cited

U.S. PATENT DOCUMENTS 6,630,586 B1   10/2003  Fouache et al.
2007/0082104 A1 *  4/2007  De Baets ...................... 426/548

FOREIGN PATENT DOCUMENTS

EP    1006128           8/2004
WO   WO 2004043166 A1 *  5/2004
WO   WO 2004-068966     8/2004

OTHER PUBLICATIONS

Lees et al., Sugar Confectionery and Chocolate Manufacture, Leonard Hill Books, 1973, pp. 15, 22-37.*
Kaneko, T. et al. "Digestibility of Isomaltooligosaccharides by Rats and Effects on Serum Lipids," *Nippon Nōgeikagaku Kaishi*, 1992, pp. 1211-1220, vol. 66, No. 8.
Kohmoto, T. et al. "Effect of Isomalto-oligosaccharides on Human Fecal Flora," *Bifidobacteria Microflora*, 1988, pp. 61-69, vol. 7, No. 2.
Kohmoto, T. et al. "Metabolism of $^{13}$C-Isomaltooligosaccharides in Healthy Men," *Biosci. Biotech. Biochem.*, 1992, pp. 937-940, vol. 56, No. 6.
Park, J. H. et al. "Growth Effect of Branched Oligosaccharides on Principal Intestinal Bacteria," *Kor. J. Appl. Microbiol. Biotechnol.*, 1992, pp. 237-242, vol. 20, No. 3.

* cited by examiner

*Primary Examiner* — Jyoti Chawla
(74) *Attorney, Agent, or Firm* — Saliwanchik, Lloyd & Eisenschenk

(57) ABSTRACT

The present invention describes a carbohydrate composition having a greater impact on the insulinemic response than on the glycemic response comprising a soluble dietary fiber and a glucose syrup, process to prepare it and their use in food.

12 Claims, 1 Drawing Sheet

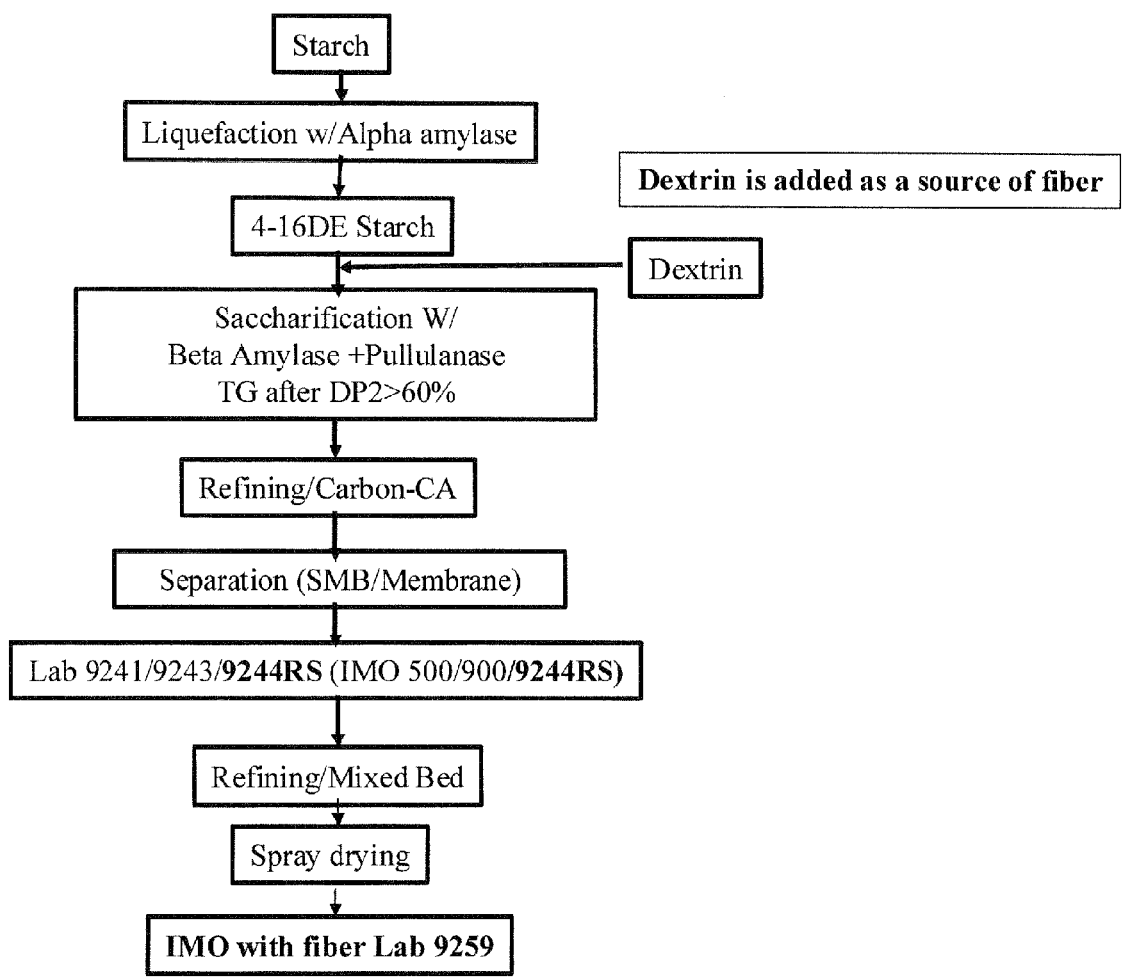

CARBOHYDRATE COMPOSITIONS HAVING A GREATER IMPACT ON THE INSULINEMIC RESPONSE THAN ON THE GLYCEMIC RESPONSE, THEIR PREPARATION AND THEIR USES

FIELD OF THE INVENTION

The present invention relates to a carbohydrate composition having a greater impact on the insulinemic response than on the glycemic response.

BACKGROUND OF THE INVENTION

Starch hydrolysates, which include maltodextrins, glucose syrups and pure dextrose, are conventionally produced by the acidic and/or enzymatic hydrolysis of cereal or tuber starch. These hydrolysates contain a complex mixture of linear and branched saccharides and are, in fact, a mixture of glucose and glucose polymers, of extremely varied molecular weights. A first way of classifying them is the measurement of their reducing power, expressed conventionally by the concept of dextrose equivalent or D.E. By definition, a D.E. of 100 is assigned to pure glucose or dextrose, the monomer constituting these polymers. Starch, which is a very large glucose polymer, has a D.E. close to 0. A whole range of starch hydrolysates is found between these two values, the most hydrolysed having a D.E. close to 100 and the least hydrolysed having a D.E. which tends towards 0. Between both ranges, the maltodextrins have a dextrose equivalent (DE) of 1 to 20, and the glucose syrups have a DE greater than 20.

Starch hydrolysates, such as 25 to 63 DE glucose syrup and maltose syrup, have been widely used for food applications due to their availability, high tolerance, processability, and low cost. For those concerned with healthy diet applications and obesity, glucose syrup has the disadvantage of high sugar content.

Soluble dietary fiber, such as inulin, FOS, and polydextrose, has gained increased recognition as a beneficial food ingredient for the reduction of the fiber deficit prevalent in the diet of many developed countries, (e.g. United States, Europe). Dietary fiber is well known for its numerous health benefits including laxation, an increase in the faecal weight, stimulation of colonic fermentation, a reduction in blood total and/or LDL cholesterol levels, and a reduction in post-prandial blood glucose and/or insulin levels. In particular, EP 443 789 discloses the use of a pyrodextrin in a food composite for saving insulin secretion without any influence on blood glucose value. However, commercially available soluble dietary fiber suffers from the disadvantages of digestive intolerance in the form of excessive flatulence and diarrhea, low viscosity, and an undesirable taste and mouthfeel.

The term "oligosaccharide" encompasses carbohydrates that are larger than simple mono- or disaccharides but smaller than polysaccharides (greater than 9 units).

Oligosaccharides such as maltooligosaccharides, isomaltooligosaccharides (IMO) and fructooligosaccharides are gaining more attention especially in Asia markets. Oligosaccharides are purchased by food processors as an ingredient for a variety of functional foods. IMO have been produced in Asia for the past 15-20 years and are used in a variety of food applications. Most of the current use of IMO as a health food ingredients in Asian countries, like Japan, China & Korea. The use of IMO is more prevalent in Japan than any other non-digestible oligosaccharides. In 2003, IMO demand in this country was estimated 11,000 tons. IMO has been used as a sweetener in Japan for many years. IMO syrup is effectively used for traditional fermented foods in Japan.

Isomaltooligosaccharides, specifically, are glucose oligomers with α-D-(1,6)-linkages, including among others isomaltose, panose, isomaltotetraose, isomaltopentaose, nigerose, kojibiose and higher branched oligosaccharides. While human intestinal enzymes readily digest α-(1,4)-glycosidic bonds, α-D-(1,6)-linkages, particularly those linking longer polymers, are not easily hydrolyzed as they pass through the human gastrointestinal tract. That is why one of the benefits of oligosaccharides, e.g., isomaltooligosaccharides is to possess a health promotion effect, e.g. prebiotic (Kohmoto T., Fukui F., Takaku H., Machida Y., et al., Bifidobacteria Microflora, 7(2)(1988), 61-69; Kohmoto K., Tsuji K., Kaneko T. Shiota M., et al., Biosc. Biotech. Biochem., 56(6)(1992), 937-940; Kaneko T, Kohmoto T., Kikuchi H., Fukui F., et al., Nippon Nogeikagaku Kaishi, 66(8)(1992), 1211-1220, Park J-H, Jin-Young Y., Ok-Ho S., Hyun-Kyung S., et al., Kor. J. Appl. Microbiol. Biotechnol., 20(3)(1992), 237-242).

In Japan, China, Hong-Kong, Korea and Taiwan, IMO has been recognized by regulatory agencies, and this food ingredient is in market for many decades. Currently, IMO is being consumed by local populations in those countries by adding this product into a number of functional foods to exhibit health benefits, like prebiotic functions & overall improvement of digestive health.

Physiological and functional benefits of oligosaccharides include digestive tolerance, viscosity, and a desirable taste and mouthfeel. However, existing oligosaccharides have the disadvantage of relatively high sugar content, defined as the total sum of monosaccharides and disaccharides, and low detectable levels of dietary fiber, as determined by the fiber methods approved by the Association of Official Analytical Chemists. For example, commercially available isomaltooligosaccharides, e.g. IMO 500 and IMO 900 product, typically have 20-35% monosaccharides, 10 to 40% disaccharides, and less than 5% dietary fiber.

Nevertheless, IMO present also a lot of non negligible advantages. IMO syrups could replace part or all of liquid sugar syrups to produce different sweetness profiles for beverages since they are about half as sweet as sucrose. They could also be added during beer production as non-fermentable sugar syrups to replace some of the fermentable sugars altering the residual sweetness and mouthfeel of the resulting beers. Their anti-cariogenic properties could be employed by using them as replacements for sugars in many confectionary products. Dental caries are caused by insoluble glucane gums forming on the surface of teeth (plaque), and the formation of acids under this plaque which attacks the tooth enamel. The reported higher moisture retaining (water-binding) capacity which would confer improved resistance to bacterial infection could be an advantage in the baking industries in developing products with slower staling rates. However, it would appear that the major advantages and the major areas of use and interest are in the functional food area covering prebiotic products. In Japan, there are a number of so called functional foods sold which have reported health benefits, some of which use IMO as ingredients. Prebiotics are non-digestible carbohydrates that pass through the small intestine undigested and are then fermented in the colon to produce range of small chain fatty acids, specifically butyrate. It has been reported in clinical trials that IMO do not cause diarrhea when used in recommended doses. IMO are foods sources that are preferentially chosen by probiotic bacteria (live beneficial bacteria) such as bifidobacteria in the gut that reportedly help modulate the gut microflora and improve the intestinal microbial balance.

Currently, IMO is being formulated by a number of companies in United States, particularly as a source of soluble fiber and prebiotic in a range of beverages. However, in European Union., the expected use of IMO by the general population will be as a nutritive sweetener with functionality of prebiotic and fiber, mixing with a variety of other foods and beverages products for the purpose of sweetening. IMO will be used as a general food ingredient to be formulated with a range of food products manufactured by beverage industries, dairy industries and all kind sweets and dessert making industries.

Until recently carbohydrates have been classified as "simple" and "complex" based on their degree of polymerization; however, their effects on health may be better described on the basis of their physiological effects (i.e. ability to raise blood glucose), which depend both on type of constituent sugars (e.g. glucose, fructose, galactose) and the physical form of the carbohydrates. This classification is referred to as glycemic index (GI). The GI was introduced to classify carbohydrate foods according to their effect on postprandial glycemia. The GI is defined as the incremental blood glucose area after ingestion of a test product, expressed as a percentage of the corresponding area after a carbohydrate-equivalent load of a reference product (glucose or white-bread). The GI categorizes foods containing carbohydrates by their capacity of increasing glucose levels (velocity and magnitude). It is measured by comparing the increase in glucose level induced by an isolated food, under isoglucidic conditions (50 g of carbohydrates), with that induced by a chosen reference food, the most frequently used ones being a pure glucose solution. GI is defined by comparing the sum of glycemia values or the area under the curve within two hours of ingestion of the studied food with changes observed with the chosen food of reference defines. The response obtained with the reference food is given a value of 100, and all the other foods are compared to this value, expressed as percent value. GI values are grouped in three categories. High GI (≥70), intermediate (GI (56-69), and low GI (0-55). The insulinemic index (II) can be calculated from the correspondent incremental insulin areas. II is obtained under identical conditions to those for GI, simply replacing the measure of glucose with a measure of insulin. The index was introduced as a result of possible concern that blood-glucose responses might not adequately reflect the responses of the major anabolic hormone insulin, which is central to abnormal carbohydrates metabolism in type 1 diabetes mellitus.

It has now been well established that the glucose and insulin responses to different foods can vary significantly. Variations in the response can be due to a range of factors such as: type and amount of carbohydrate, protein and fat; method of food processing food form; dietary fiber etc.

It is recognized among those concerned with healthy diet applications and obesity the need for a carbohydrate inducing a lower insulinemic response and less influence on glycemic response. More particularly, there is a need for a carbohydrate with a low insulinemic response, a low level of sugars, and soluble dietary fiber with the advantages of digestive tolerance, viscosity, and a desirable taste and mouthfeel. Accordingly, it is recognized that a method of producing said carbohydrate with cost effective and industrial feasible technology is advantageous.

SUMMARY OF THE INVENTION

The inventors surprisingly observed that a carbohydrate composition with a particular range of soluble dietary fiber can provoke a greater effect on insulinemic response than on glycemic response. In addition, they also observed that this differential effect is more intense when the soluble dietary fiber is combined with a reduced sugar glucose syrup.

Accordingly, the present invention concerns a carbohydrate composition comprising a soluble dietary fiber and a glucose syrup, wherein the soluble dietary fiber comprises at least one carbohydrate resistant to digestion by pancreatic enzymes, the glucose syrup comprises or consists of monosaccharides, di-saccharides and oligosaccharides, and the soluble dietary fiber in the composition is in an amount suitable for obtaining a ratio RIR (Relative Insulinemic Response)/RGR (Relative Glycemic Response) lower than 0.90. Preferably, the content of soluble dietary fiber is between about 30% and about 50% on a dry basis of said composition as determined by AOAC 2001.03. Preferably, the soluble dietary fiber is dextrin and/or maltodextrin, preferably branched dextrin and/or maltodextrin. Optionally, the soluble dietary fiber is any one or combination of soluble dietary fiber selected from the group consisting of inulin, polydextrose, fructooligosaccharides, and beta glucans. Preferably, the content of digestible mono- and di-saccharides (DP1 and DP2) in said glucose syrup or said composition is no more than about 10% on a dry basis of said syrup or composition, preferably less than about 5%. More preferably, the glucose syrup contains about 75% or higher of isomaltooligosaccharides on a dry basis of said syrup, and in particular about 80% or higher of DP3 to DP8 saccharides on a dry basis of said syrup. Still more preferably, the panose content of said syrup is at least about 5% or higher on a dry basis of said syrup, preferably about 10% or 25% or 40% or higher. Preferably, the isomaltotriose content of said syrup is about 5% or higher on a dry basis of said syrup, preferably about 15% or 25% or higher. In a particular embodiment, the DE (dextrose equivalent) of said composition is about 15 or higher, and less than 40 (i.e., between about 15 and 40). In another particular embodiment, the D.E. of said composition is comprised between 18 and 25 for the product Lab 9259 and between 23 and 30 for the product Lab 9244. Preferably, the composition is substantially dry.

The present invention also concerns methods for producing the composition according to the present invention. In a first embodiment, the present invention concerns a method for producing the composition according to the present invention, comprising:

a) liquefying starch with alpha amylase;

b) adding to the product obtained by step a) a soluble dietary fiber comprises at least one carbohydrate resistant to digestion by pancreatic enzymes;

c) saccharifying the mixture with at least two enzymes beta amylase and pullulanase;

d) optionally, adding to the mixture a transglucosidase if the content of DP2 saccharides is higher than 60% on a dry basis of the mixture; and e) removing DP1 and DP2 saccharides from the mixture.

In a second embodiment, the present invention concerns a method for producing the composition according to the present invention, comprising the liquid blending of the glucose syrup and the soluble dietary fiber.

In a third embodiment, the present invention concerns a method for producing the composition according to the present invention, comprising the dry blending of the glucose syrup and the soluble dietary fiber.

The present invention also concerns the use of the composition according to the present invention for preparing a beverage, food, feed, nutraceutical, dietary supplement or functional food. Accordingly, it concerns a method for preparing a beverage, food, feed, nutraceutical, dietary supplement or functional food comprising adding the composition according to the present invention to at least one component selected from the group consisting of beverage ingredients, food ingredients, animal feed ingredients, pet food ingredients, nutraceutical ingredients, dietary supplement ingredients, and functional food ingredients. In particular, it concerns a product comprising the composition according to the present invention and at least one component selected from the group consisting of beverage ingredients, food ingredients, animal feed ingredients, pet food ingredients, nutraceutical ingredients, dietary supplement ingredients, and functional food ingredients.

BRIEF DESCRIPTION OF THE DRAWING

FIG. 1 shows a flow diagram of a method for producing a carbohydrate composition according to the present invention.

DETAILED DESCRIPTION OF THE INVENTION

Definition

By "RIR" is intended herein Relative Insulinemic Response calculated using the mean of the 2 glucose test meals as the control and arbitrary set at 100. Insulin level can be for instance determined as detailed in Examples.

By "RGR" is intended herein Relative Glycemic Response calculated using the mean of the 2 glucose test meals as the control and arbitrary set at 100. Glucose level can be for instance determined as detailed in Examples.

By "DP" is intended the number of saccharide units.

By "DP1" saccharide is intended herein monosaccharide, preferably dextrose.

By "digestible DP2" saccharide is intended herein two glucose units with an alpha 1→4 linkage and therefore refers to maltose.

By "linear" saccharide is intended herein an oligosaccharide with glucose units linked by only alpha 1→4 linkages. For instance, maltose is considered as a digestible linear DP2 saccharide.

By "branched" saccharide is intended herein an oligosaccharide with glucose units linked by alpha 1→4 linkages, but also by 1→46 linkages and optionally 1→2 and/or 1→3 linkages. For instance, isomaltose is considered as indigestible branched DP2 saccharide.

The percentages in the present application are expressed by weight on the dry basis unless otherwise stated.

Where "about" is used in connection with a number, this preferably means the number +/−10%, more preferably the number +/−5%, most preferably the number itself without "about".

The percentage of soluble dietary fiber is determined by AOAC 2001.03.

By "isomaltooligosaccharides" is intended herein a glucose-containing oligosaccharide comprising at least two glucose units linked by a 1→6 linkage.

By the expression "dextrin" is intended herein the standard dextrin conventionally obtained by acid and/or enzymatic hydrolysis of starch.

By the expression "maltodextrin" is intended herein the standard maltodextrin conventionally obtained by acid and/or enzymatic hydrolysis of starch, and characterized by a reducing power, expressed as Dextrose Equivalent (or DE), of less than 20.

The composition of the invention comprises a soluble dietary fiber comprising at least one carbohydrate derived from starch or other sources that is resistant to digestion by pancreatic enzymes and a glucose syrup.

The content of soluble dietary fiber in the composition is in an amount suitable for obtaining a ratio RIR (Relative Insulinemic Response)/RGR (Relative Glycemic Response) lower than 0.90, preferably equal to or lower than 0.86, more preferably between equal to or lower than 0.83. For instance, the ratio can be comprised between 0.70 and 0.90, preferably between 0.75 and 0.8. Preferably, the ratio is higher than 0.5, 0.6, or 0.7.

In particular, the present invention concerns a carbohydrate composition comprising a soluble dietary fiber and a glucose syrup, wherein the soluble dietary fiber comprises at least one carbohydrate resistant to digestion by pancreatic enzymes, the glucose syrup comprises or consists of mono-saccharides, di-saccharides and oligosaccharides, and the content of soluble dietary fiber in the composition is greater or equal to 30% on a dry basis of the composition, preferably at least about 30 or 35%. For instance, the content of soluble dietary fiber in the composition can range between about 30% and about 50%, preferably between about 35% and 45 or 50% on a dry basis of the composition. By soluble dietary fiber is intended soluble in water.

The soluble dietary fiber can be for instance inulin, fructooligosaccharides, beta glucans or polydextrose but is preferably an indigestible soluble dietary fiber derived from starch, for instance from corn, wheat, rice, potato or cassava starch. Accordingly, the soluble dietary fiber is preferably an indigestible dextrin and/or maltodextrin, preferably derived from starch. More preferably, the soluble dietary fiber essentially comprises or consists of an indigestible dextrin and/or maltodextrin. The dextrin or maltodextrin may be used as they are or in their hydrogenated form. Indigestible dextrins can be obtained by dry roasting of starch in an acidic medium, more specifically called pyrodextrin.

Preferably, the soluble dietary fiber is an indigestible dextrin, maltodextrin or a mixture thereof.

In a preferred embodiment, the indigestible dextrin or maltodextrin is a branched dextrin or maltodextrin. The expression "branched dextrin" or "branched maltodextrin" is understood to mean, for the purposes of the present invention, the branched dextrins with higher ratio of 1→46 glucoside linkages than standard dextrins and also 1→2 and 1→43 glucoside linkages. In standard dextrins or maltodextrins, the ratio of 1→46 glucoside linkages is about 4-5% of total glucoside linkages. Accordingly, the preferred branched dextrins present a ratio of 1→6 glucoside linkages comprised between 10 and 35% of total glucoside linkages, preferably 25 and 30% of total glucoside linkages and optionally a ratio of 1→2 or 1→3 glucoside linkages comprised between 5 and 15% of total glucoside linkages. In particular, these indigestible dextrins are described in Patent Application EP 443 789 (the disclosure of which is incorporated herein by reference). In particular, these indigestible maltodextrins are described in Patent Application EP 1 006 128 (the disclosure of which is incorporated herein by reference). For example, these indigestible maltodextrins can be those marketed by the applicant under the name NUTRIOSE®.

The glucose syrup comprises or consists of mono-saccharides, di-saccharides and oligosaccharides. In a particular embodiment, the glucose syrup of the composition can be a corn syrup. The corn syrup can have a DE higher than 35, preferably higher than 55. The glucose syrup can be an isomaltooligosaccharides (IMO) syrup, for instance commercially available IMO (500) product (Showa). PCT application WO 2004/068966 and European patent application EP 875 585 teach method for producing IMO rich syrups.

In a preferred embodiment, the glucose syrup of the composition has a low content of digestible sugar. Preferably, the glucose syrup of the composition has a reduced content in mono- and digestible linear di-saccharides (DP1 and DP2), preferably less than about 10% in dry content of the syrup, more preferably less than about 5%. In a more particular embodiment, the glucose syrup of the composition has a reduced content in mono- and di-saccharides (DP1 and DP2), including isomaltose, preferably less than about 10% in dry content of the syrup, more preferably less than about 5%. Such a isomaltooligosaccharides syrup is commercially available as IMO (900) product (Showa). In addition, in a preferred embodiment, the composition has a content in mono- and digestible linear di-saccharides (DP1 and DP2) of less than about 10% in dry content of the composition, preferably less than about 5%. In addition, the composition can have a content in mono- and di-saccharides (DP1 and DP2), including isomaltose of less than about 10% in dry content of the composition, preferably less than about 5%.

In a preferred embodiment, the glucose syrup with a low content of digestible sugar contains about 75% or higher of isomaltooligosaccharides on a dry basis of said syrup.

Existing IMO are usually produced by using beta amylase and transglucosidase starting from liquefied starch or maltose and by enriching IMO through the removal of monosaccharide by membrane or chromatography separation to achieve desired IMO level. Accordingly, since isomaltose is one of main components of IMO, they are presented in existing IMO products with high concentration (>20%). In addition, as it is near impossible to separate maltose from isomaltose, existing IMO products were resulted from a separation between monosaccharide and disaccharides, leading to high concentration of disaccharides such as maltose in IMO products. For instance, basic IMO 500 has high concentration of dextrose (>25%), maltose (20%) and isomaltose (15%). In addition, existing IMO does not have high enough fiber content to allow fiber claims in food applications.

The present invention overcomes the problems of existing process and products by removing isomaltose from IMO product resulting in very low sugar IMO, and by successfully separate disaccharides from trisaccharides by choosing process conditions and specific membrane which removed disaccharides and monosaccharides resulting in the production of a reduced sugar or sugar-free IMO that may be used in sugar-free food, beverage, and pharmaceutical applications. More specifically, the process for producing the reduced sugar or sugar free IMO in accordance with the present invention involves a two step reaction process achieving a syrup with a high isomaltotriose content followed by separation of the oligosaccharides of DP3 and greater from the monosaccharides and disaccharides, including isomaltose, using a nanofiltration membrane. Preferably, the first reaction process involves reacting two enzymes, preferably beta-amylase and a de-branching enzyme, more preferably pullulanase, isoamylase, or a combination of the two, with a low DE and low DS (dry substance) liquefied starch to achieve a high maltose syrup. The liquefaction of the starch preferably uses acid or enzyme, more preferably alpha amylase. The liquefied starch contains a target range of 2 to 16 DE, more preferably a DE of about 4 to 12, and a DS at about 25%. The reaction conditions preferably involve a temperature of at least 52° C., more preferably of about 60° C. and less than about 70° C., a pH of at least 4.5, more preferably of about 5.0 and less than about 5.5, and a reaction time suitable to achieve a syrup with a maltose content of at least 80%, preferably a reaction time of at least 25 hours, more preferably of about 30 hours and less than about 40 hours. The second reaction process preferably involves reacting a transglucosidase enzyme with a high maltose syrup containing at least 80% maltose at a temperature of at least 55° C., more preferably of about 60° C. and less than about 70° C., a pH of at least 4.5, more preferably of about 5.0 and less than about 5.5, and a reaction time suitable to achieve a syrup with a panose content of at least 5%, preferably about 10% and an isomaltotriose content of at least 5%, preferably at least about 10% or 20% or higher. The resulting syrup of the second reaction step is separated using nanofiltration to achieve a syrup containing a panose content of at least 5%, preferably about 10%, 25%, 40% or higher on a dry basis, an isomaltotriose content of at least 10% on a dry basis of said syrup, preferably about 15% or 25% or higher, and a DP1 and DP2 content of less than about 10%, preferably less than about 5%. Preferably, the nanofiltration membrane is a DL or GH membrane with a targeted molecular weight cut off about 800 daltons at a targeted pressure of less than about 500 psi, more preferably of about 300 psi to about 400 psi, and a targeted temperature of less than about 55° C., more preferably of about 40° C. to about 50° C.

In a preferred embodiment, the above described process allows the production of the Lab 9244.

Produced IMO may have fiber content by using different sources of starch hydrolysates. Experiments of the inventors were performed following the described steps, and obtained product surprising shows the follows analytical properties: <1% dextrose, 1% maltose, 7% isomaltose, >90% DP3 and higher, in particular among which about 25% isomaltotriose, and about 20% fibers for the product Lab 9244.

It is well known that dextrose and maltose contributing to good digestive tolerance and indigestive carbohydrates e.g., fiber, causing laxation. Surprisingly, it was found that an IMO product such as Lab 9244 with the removal of almost all dextrose, maltose and isomaltose still have tolerance higher than 100 g per day based on in-house panel evaluation. More surprisingly, this product was spray dried or used in hard candy system, it has extremely high glass transition temperature, much higher than existing IMO products and products of similar molecular weight.

In addition, it was surprised that when the above product was tested with in-vitro digestion method (reference), it was found that hydrolysis (digestion) of IMO products of the invention were very low after 4 hours even for those products having low fiber content. This indicated that the IMO products of the present invention is slowly digested and possess extended energy properties. Slow digestion is good for human health for reducing risk of obesity due to blood sugar spike, weight control due to satiety, and improving intestinal regulation.

Preferably, the reduced sugar glucose syrup, in particular the reduced sugar isomaltooligosaccharides syrup, contains about 80% or higher of DP3 to DP8 saccharides on a dry basis of said syrup. Preferably, said reduced sugar isomaltooligosaccharides syrup may comprise isomaltotriose, isomaltotetraose, isomaltopentaose, and mixtures thereof. In particular, the carbohydrate composition of the invention contains about 50% or higher of DP3 to DP8 saccharides on a dry basis of said composition, preferably more 60 or 70% of DP3 to DP8 saccharides on a dry basis of said composition. More preferably, the reduced sugar glucose syrup, in particular the reduced sugar isomaltooligosaccharides syrup, contains a high content of isomaltotriose and panose. For instance, the isomaltotriose content of said syrup is about 20% or higher on a dry basis of said syrup, for instance about 25, 30, 40 or 50%. Accordingly, the carbohydrate composition of the invention may contain about 20% or higher on a dry basis of said syrup, for instance about 25, 30, 40 or 50%.

The composition of the invention may also be characterized by the DE. Preferably, the DE is about 15 or higher, and less than 40.

The carbohydrate composition of the invention can be liquid, pasty or dry. In a preferred embodiment, the composition is substantially dry.

The present invention also concerns methods for preparing the carbohydrate composition of the invention.

A first method comprises the dry blending of the glucose syrup and the soluble dietary fiber.

A second method comprises the liquid blending of the glucose syrup and the soluble dietary fiber. The obtained carbohydrate composition can be further dried, for instance through spray-drying, to a solid or substantially dry product.

In these first and second method, the glucose syrup and the soluble dietary fiber are as detailed above. In particular, the ratios of each component have to be adapted to obtain a final composition with the requested percentages. Generally, the fiber content represents at least 25% of the composition (weight to weight), and preferably 30%, or even more.

The two components are blended in a suitable amount for having the necessary content in soluble dietary fibers. In a preferred embodiment, in addition to fibers and glucose, special linkage compositions may also be added to the blend.

A third method comprises:
a) liquefying starch with alpha amylase, preferably to a target range of 2-16 DE;
b) adding a soluble dietary fiber comprises at least one carbohydrate resistant to digestion by pancreatic enzymes;
c) saccharifying the mixture with at least two enzymes beta amylase and pullulanase, and optionally one or several other enzymes such as isoamylase, transglucosidase, glucoamylase, and fructoisomerase;
d) optionally, adding to the mixture a transglucosidase if the content of DP2 saccharides is higher than 60% on a dry basis of the mixture; and
e) removing DP 1 and DP2 saccharides from the mixture, wherein reaction conditions of steps c) and d) preferably involve a temperature of at least 55° C., more preferably of about 60° C. and less than about 70° C., a pH of at least 4.5, more preferably of about 5.0 and less than about 5.5, and a reaction time suitable to achieve a syrup with a panose content of at least 5%, preferably about 10% and an isomaltotriose content of at least 5%, preferably at least about 10% or 20% or higher.

Preferably, the soluble dietary fiber is one disclosed above, and in particular a dextrin and/or a maltodextrin, more preferably branched dextrin and/or maltodextrin. Steps b) and c) can also be concomitant.

The removal of DP 1 and DP2 can be carried out through separation chromatography, membrane filtration, or separation chromatography followed by membrane filtration. Preferably, the separation chromatography conditions comprise a temperature of less than about 80° C. and a resin of calcium, potassium, or sodium composition to separate the oligosaccharides of DP3 and greater from the monosaccharides and disaccharides, including isomaltose. More preferably, the membrane filtration conditions comprise the use of a nanofiltration membrane, preferably DL or GH membrane, with a targeted molecular weight cut off about 800 daltons at a targeted pressure of less than about 500 psi, more preferably of about 300 psi to about 400 psi, and a targeted temperature of less than about 55° C., more preferably of about 40° C. to about 50° C. Still more preferably, the separation chromatography conditions are followed by the nanofiltration membrane conditions described herein. The present invention also concerns a product comprising the carbohydrate composition according to the present invention and at least one component selected from the group consisting of beverage ingredients, food ingredients, animal feed ingredients, pet food ingredients, nutraceutical ingredients, dietary supplement ingredients, and functional food ingredients.

The present invention further concerns a method for preparing a beverage, food, feed, nutraceutical, dietary supplement or functional food comprising adding the carbohydrate composition according to the present invention to at least one component selected from the group consisting of beverage ingredients, food ingredients, animal feed ingredients, pet food ingredients, nutraceutical ingredients, dietary supplement ingredients, and functional food ingredients. It also concerns the use of the carbohydrate composition according to the present invention for preparing a beverage, food, feed, nutraceutical, dietary supplement or functional food.

Other objects, features and advantages of the invention will become apparent in the course of the following examples.

EXAMPLES

Example 1

Preparation of Lab 9244

Starting material: liquefied starch having DE about 5 at about 25% DS (Dry Substance).

Process step 1: beta amylase (from Genencor enzyme) and debranching enzyme (from Novozyme), 60° C., pH 5.3, after about 30 hrs, resulted >80% maltose.

Process step 2: 0.2% Transglucosidase TGL-500 (Genencor enzyme), pH 5.1, 140 F, 24 hrs.

Product: 37.8% dextrose, 8.3% maltose, 22.4% isomaltose, 9.3% panose, 9.2% isomaltotriose, 12.9% others.

Process step 3: product from step 2 was fed to a nanofiltration membrane from General Electric Company (designation DL or GH for the membrane) at 400 psi and 50° C. Permeate was removed, and retentate recycled for further fractionation until total mono and di-saccharides less than 10%.

Resulted product is a reduced sugar IMO: 0.8% DP1, 1.0% DP2, 7.0% isomaltose, 2.9% maltotriose, 8.0% panose, 23.07% isomaltotriose, 57.2% others. Total fiber is around 20%.

Example 2

Preparation of Lab 9259

The Lab 9259 can be prepared by two different ways, according to the points 2A and 2B as described below:

2A:

Starting material: high maltose syrup with 50% dextrin (Stadex 90).

Process step 1: 0.2% TG enzyme (from Genencor) at pH 5.2 and 60° C. for 40-70 hours.

Resulted product: 39.02% DP1, 23.4% DP2, 11.6% DP3, and 26% DP4+. The fiber content with AOAC 2001.03 was 17.1%.

Process Step 2: product from step 1 was fed to a nano membrane DL or GH membrane (from GE) at 400 psi and 50° C. Permeate was removed, and retentate recycled for further fractionation until total mono and di-saccharides less than 10%.

Resulted product is a reduced sugar high fiber IMO with the following profile: <2% DP1, <2% DP2, 5.8% isomaltose, 6.4% panose, 11.44% isomaltotriose, 72.4% others. Total fiber is 35%.

2B:

Step 1: Blend product from example 1 and Nutriose 06 at ratio 70:30.

Step 2: Refining resulted blend by cation and anion IX.

Step 3: evaporation.

The resulted product is a reduced sugar high fiber IMO with the following profile: 0.7% DP1, 0.8% DP2, 4.9% iso-maltose, 5.6% panose, 16.1% isomaltotriose, 66.6% others. Total fiber is 35%.

Example 3

Insulinemic and Glycemic Responses

Methods

Subjects: Twelve healthy subjects (9 males and 3 female) aged 30±7 years with a body mass index of 25.9±3.3 $kg/m^2$ were studied. The ethnicity of the study group was: 7 Caucasian, 1 East Asian, 1 African American, 1 Latino, 1 Filipino and 1 Sudanese-African. The individual details are shown on the Table 1.

TABLE 1

| ID | Sex | Ethnicity | Age (yrs) | Height (cm) | Height (in) | Weight (kg) | Weight (lb) | BMI (kg/m²) |
|---|---|---|---|---|---|---|---|---|
| 1 | M | African American | 41 | 169.0 | 65.9 | 92.0 | 202.4 | 32.2 |
| 12 | M | Caucasian | 42 | 174.0 | 67.9 | 82.0 | 180.4 | 26.4 |
| 38 | M | Caucasian | 25 | 186.0 | 72.5 | 92.2 | 202.8 | 26.7 |
| 127 | M | Latino | 35 | 176.0 | 68.6 | 59.5 | 130.9 | 19.2 |
| 129 | M | Caucasian | 32 | 172.0 | 67.1 | 80.9 | 178.0 | 27.3 |
| 141 | F | Caucasian | 26 | 144.5 | 56.4 | 51.0 | 112.2 | 24.4 |
| 177 | F | East Asian | 21 | 151.0 | 58.9 | 68.5 | 150.7 | 30.0 |
| 201 | M | Filipino | 29 | 171.0 | 66.7 | 71.0 | 156.2 | 24.3 |
| 244 | M | Sudanese/ African | 25 | 174.5 | 68.1 | 70.8 | 155.8 | 23.3 |
| 281 | M | Caucasian | 23 | 186.0 | 72.5 | 84.0 | 184.8 | 24.3 |
| 318 | M | Caucasian | 28 | 184.0 | 71.8 | 89.7 | 197.3 | 26.5 |
| 337 | F | Caucasian | 38 | 155.0 | 60.5 | 63.5 | 139.7 | 26.4 |
| | Mean | | 30 | 170.3 | 66.4 | 75.4 | 165.9 | 25.9 |
| | ±SD | | 7 | 13.6 | 5.3 | 13.4 | 29.6 | 3.3 |

Protocol: On test day, subjects came in the morning after a 10-14 h overnight fast. After being weighed and having a fasting blood sample obtained by finger-prick, the subject then consumed a test meal within 10 minutes, and further blood samples were obtained at 15, 30, 45, 60, 90 and 120 minutes after the start of the test meal.

Blood samples: Each finger-prick sample consists of a total of 8-10 drops of blood obtained by finger-prick and divided into two separate vials. Two to 3 drops of capillary blood were collected into flat-bottomed 5 ml plastic tubes with a push cap containing a small amount of sodium fluoride and potassium oxalate as an anticoagulant and preservative. These samples were used for analyzing capillary blood glucose levels. The remaining 6 to 8 drops of capillary blood were collected into the a microvette CB300 (Sarsted) vial and were used for insulin analysis.

Test meals: Eight test meals were consumed; all meals contained 50 g of carbohydrate and were mixed with 300 ml of water. The test meals are disclosed in Table 2.

TABLE 2

| Test meal | Percentage of Fiber (%) in dry content |
|---|---|
| Glucose | 0 |
| NUTRIOSE ® FM 06 | 85 |
| Corn syrup DE63 | 0 |
| NUTRIOSE ® FM 06 + Corn Syrup DE63 (1-2 ratio) | 30 |
| NUTRIOSE ® FM 06 + Corn Syrup DE63 (2-1 ratio) | 56 |
| LAB9244 | 20 |
| NUTRIOSE ® FM 06 + LAB 9244 (LAB9259; ratio = 30:70)) | 35 |

Biochemical analysis: The finger-prick samples for glucose analysis were initially placed in the refrigerator and at the end of two hours, placed in a −20° C. freezer until analysis which was performed within a week. Glucose analysis was done using a YSI model 2300 STAT analyzer (Yellow Springs, Ohio). The microvette tubes were centrifuged and the serum transferred to labelled polypropylene tubes and stored at −20° C. prior to analysis of insulin. Insulin levels were measured using the Human Insulin EIA Kit (Alpco Diagnostics).

Statistical analysis: Results were tabulated and incremental areas under the blood glucose and insulin response curves (AUC), ignoring area below fasting, are calculated. Results for all foods in a series were compared by repeated measures ANOVA using the Neuman-Kuels method to adjust for multiple comparisons. Relative glycemic response (RGR) and Relative insulinemic response (RIR) were calculated using the mean of the 2 glucose test meals as the control and arbitrary set at 100.

Results

The results are disclosed in Table 3.

TABLE 3

| Test meal | RGR | RIR | RIR/RGR |
|---|---|---|---|
| Glucose | 100 | 100 | 1 |
| NUTRIOSE ® FM 06 | 29.4 | 27.4 | 0.93 |
| Corn syrup DE63 | 110.3 | 112.2 | 1.02 |
| NUTRIOSE ® FM 06 + Corn Syrup DE63 (1-2 ratio) | 85.3 | 78.6 | 0.92 |
| NUTRIOSE ® FM 06 + Corn Syrup DE63 (2-1 ratio) | 71.5 | 71.9 | 1.01 |
| LAB9244 | 89.3 | 99.9 | 1.12 |
| NUTRIOSE ® FM 06 + LAB 9244 (LAB9259; ratio = 30:70) | 75.6 | 61.3 | 0.81 |

These results clearly demonstrate that a ratio of at least 30% of fiber is necessary to induce a differential decrease in the RIR in comparison to the RGR as shown by the ratio RIR/RGR. In addition, it can be observed a lower ratio RGR/RIR when the fiber is used in combination with IMOS composition with low content in mono- and di-saccharides.

Example 4

Food Applications

Ready to Eat Breakfast Cereals

The coating of ready to eat breakfast cereals comprising a carbohydrate composition according to the present invention can be prepared as follows. The said carbohydrate composition replaces sugar on a one for one basis in a standard formulation. The said carbohydrate composition at 70-72% DS (dry substance) is heated to 120-122° C. The subsequent slurry is then sprayed on the base flakes, in an amount sufficient to produce a final product with approximately 10% added slurry. Then the flakes were dried at 40° C. for 45-60 min. In comparison with the standard formulation, the final product comprising said carbohydrate composition contains a reduced amount of sugar per serving, a reduced amount of doubles and triples (i.e. two and three cereal flakes/puffs sticking together following the coating process), and a pleasing mouthfeel was identified from in-house sensory evaluation.

Beverages

Beverages commonly known to industry as belly wash, isotonic beverages, and 10% juice drinks comprising a carbohydrate composition according to the present invention can be prepared as follows. The said carbohydrate composition is blended with a flavoring system and high intensity sweeteners (e.g. Aspartame and Acesulfame Potassium) to produce reduced sugar versions of these beverages containing at least 15% less sugar than the standard formulation. The said beverage is produced by mixing the ingredients with purified water, heating this solution to a temperature greater than or equal to 185° F. and holding for 10 minutes, and subsequently packing the product in a container suitable for beverages. In comparison with the standard formulation, the final product comprising said carbohydrate composition contains dietary fiber at levels of approximately 2.5 grams per serving or greater and sugar levels reduced up to approximately 90% while maintaining an acceptable flavor profile based on in-house sensory evaluation.

Nutrition Bars

Nutrition bars comprising a carbohydrate composition according to the present invention can be prepared as follows. The said carbohydrate composition replaces high fructose corn syrup on a one for one basis in a standard formulation of a traditional nutrition bar. An example of a nutrition bar composition containing said carbohydrate composition can be as follows:

| Ingredient | Nutrition Bar of Said Invention (%) |
| --- | --- |
| Tapioca flour | 3 |
| Dextrin | 14 |
| Whey protein hydrolysate | 12 |
| Nonfat dry milk | 2 |
| Soy protein hydrolysate | 5 |
| Carbohydrate of said invention | 26 |
| Honey | 6 |
| Glycerin | 9 |
| Salt | 0.2 |
| Sodium bicarbonate | 0.3 |
| Peanut Butter | 10 |
| Almonds | 12 |
| Almond extract | 0.2 |
| Vanilla extract | 0.5 |
| Total | 100 |

One method for preparing the nutrition bar is in 1 kilogram batches using the following steps: Mix all of the wet ingredients in the formula listed above, including peanut butter, in a Hobart mixer for approximately 2 minutes at low speed. Mix all of the dry ingredients separately. Add the dry ingredients to the Hobart mixer that contains the wet ingredients and mix for approximately 5 minutes at low speed. Transfer the mixed dough into a baking dish and press to a uniform depth of approximately ⅓". Cover the baking dish with an aluminum foil and bake at 310° F. for 10 min. After 10 min, remove the baked product from the oven and allow the product to cool at room temperature. After cooling, cut the product into rectangular pieces of desirable size and store at room temperature.

In comparison with the standard formulation, the final product comprising said carbohydrate composition increases the dietary fiber content of approximately 2.5 grams per serving or greater and contains at least 15% less sugar while maintaining an acceptable flavor profile based on in-house sensory evaluation. The final product comprising said carbohydrate composition maintains a softer texture than a nutrition bar comprising a standard formulation after storage for one month in a Ziploc bag at room temperature.

We claim:

1. A carbohydrate composition comprising a soluble dietary fiber and a glucose syrup, wherein the soluble dietary fiber comprises at least one carbohydrate resistant to digestion by pancreatic enzymes, the glucose syrup comprises mono-saccharides, di-saccharides and oligosaccharides, and the soluble dietary fiber in the composition is in an amount suitable for obtaining a ratio RIR (Relative Insulinemic Response)/RGR (Relative Glycemic Response) lower than 0.90,
wherein the content of digestible mono- and di-saccharides (DP1 and DP2) in said glucose syrup and said composition is no more than 10% on a dry basis of said syrup or composition;
wherein said glucose syrup contains about 80% or higher of DP3 to DP8 saccharides on a dry basis of said syrup and the content of said soluble dietary fiber is between about 30% and about 50% on a dry basis of said composition as determined by AOAC 2001.03.

2. The composition of claim 1, wherein said soluble dietary fiber is dextrin and/or maltodextrin.

3. The composition of claim 2, wherein said soluble dietary fiber is branched dextrin and/or maltodextrin.

4. The composition of claim 1, wherein said glucose syrup contains about 75% or higher of isomaltooligosaccharides on a dry basis of said syrup.

5. The composition of claim 1, wherein the isomaltotriose content of said syrup is about 5% or higher on a dry basis of said syrup.

6. The composition of claim 5, wherein the isomaltotriose content of said syrup is about 20 or 30% or higher on a dry basis of said syrup.

7. The composition of claim 1, wherein the panose content of said syrup is about 5% or higher on a dry basis of said syrup.

8. The composition of claim 7, wherein the panose content of said syrup is about 20 or 30% or higher on a dry basis of said syrup.

9. The composition of claim 1, wherein the DE of said composition is about 15 or higher and less than 40.

10. The composition of claim 1, wherein the composition is substantially dry.

11. The composition of claim 1, wherein the soluble dietary fiber consists of at least one carbohydrate resistant to digestion by pancreatic enzymes, the glucose syrup comprises mono-saccharides, di-saccharides and oligosaccharides, and the soluble dietary fiber in the composition is in an amount suitable for obtaining a ratio RIR (Relative Insulinemic Response)/RGR (Relative Glycemic Response) lower than 0.90.

12. The composition of claim 1, wherein the content of digestible mono- and di-saccharides (DP1 and DP2) in said glucose syrup or said composition is no more than 5% on a dry basis of said syrup or composition.

* * * * *

UNITED STATES PATENT AND TRADEMARK OFFICE
CERTIFICATE OF CORRECTION

| | | |
|---|---|---|
| PATENT NO. | : 8,617,636 B2 | Page 1 of 2 |
| APPLICATION NO. | : 12/571684 | |
| DATED | : December 31, 2013 | |
| INVENTOR(S) | : Liuming Zhou et al. | |

It is certified that error appears in the above-identified patent and that said Letters Patent is hereby corrected as shown below:

On the Title page, below Abstract insert --14 claims-- instead of 12.

In the Specification

<u>Column 5,</u>
Line 44, "1→46 linkages" should read --1→6 linkages--.

<u>Column 6,</u>
Line 42, "ratio of 1→46" should read --ratio of 1→6--.
Line 43, "and 1→43" should read --and 1→3--.
Line 45, "of.1→46" should read --of 1→6--.

<u>Column 9,</u>
Line 37, "removing DP 1" should read --removing DP1--.
Line 50, "removal of DP 1" should read --removal of DP1--.

In the Claims

<u>Claim 12, Column 15,</u>
Line 1, "glucose syrup or said composition is no more than 5% on a dry basis of said syrup
or composition.

should read

--glucose syrup or said composition is no more than 5% on a dry basis of said syrup or
composition.--

Signed and Sealed this
Tenth Day of February, 2015

Michelle K. Lee
*Deputy Director of the United States Patent and Trademark Office*

Add Claim 13

--13. A product comprising the composition of claim 1 and at least one component selected from the group consisting of beverage ingredients, food ingredients, animal feed ingredients, pet food ingredients, nutraceutical ingredients, dietary supplement ingredients, and functional food ingredients.--

Add Claim 14

--14. A method for preparing a beverage, food, feed, nutraceutical, dietary supplement or functional food comprising adding the composition of claim 1 to at least one component selected from the group consisting of beverage ingredients, food ingredients, animal feed ingredients, pet food ingredients, nutraceutical ingredients, dietary supplement ingredients, and functional food ingredients.

\* \* \* \* \*--.